(12) United States Patent
Chauvet et al.

(10) Patent No.: US 11,061,750 B2
(45) Date of Patent: Jul. 13, 2021

(54) CORRUPTED TRACK ANALYZER

(71) Applicant: International Business Machines Corporation, Armonk, NY (US)

(72) Inventors: Philip R. Chauvet, Tucson, AZ (US); David C. Reed, Tucson, AZ (US); Franklin E. McCune, Tucson, AZ (US); Keith R. Smith, Orlando, FL (US)

(73) Assignee: International Business Machines Corporation, Armonk, NY (US)

( * ) Notice: Subject to any disclaimer, the term of this patent is extended or adjusted under 35 U.S.C. 154(b) by 32 days.

(21) Appl. No.: 16/124,153

(22) Filed: Sep. 6, 2018

(65) Prior Publication Data

US 2020/0081762 A1 Mar. 12, 2020

(51) Int. Cl.
*G06F 11/00* (2006.01)
*G06F 11/07* (2006.01)
*G11B 27/32* (2006.01)

(52) U.S. Cl.
CPC ........ *G06F 11/0751* (2013.01); *G06F 11/073* (2013.01); *G11B 27/327* (2013.01); *G11B 27/328* (2013.01); *G11B 27/329* (2013.01)

(58) Field of Classification Search
CPC .. G06F 11/0751; G06F 11/073; G11B 27/327; G11B 27/328; G11B 27/329
USPC ........................................ 714/722, 799, 819
See application file for complete search history.

(56) References Cited

U.S. PATENT DOCUMENTS

| 4,408,273 | A | * | 10/1983 | Plow | G06F 16/902 |
| 4,855,907 | A | * | 8/1989 | Ferro, Jr. | G06F 16/9017 |
| 8,086,572 | B2 | * | 12/2011 | Kojenov | G06F 11/1469 707/681 |
| 8,892,941 | B2 | | 11/2014 | Dudgeon et al. | |
| 9,009,527 | B2 | | 4/2015 | Dudgeon et al. | |
| 9,442,805 | B2 | | 9/2016 | Dudgeon et al. | |
| 9,665,307 | B1 | * | 5/2017 | LeCrone | G06F 3/0683 |
| 9,785,517 | B2 | | 10/2017 | Huber et al. | |
| 9,927,980 | B1 | * | 3/2018 | LeCrone | G06F 11/1451 |

(Continued)

OTHER PUBLICATIONS

Wang, Peipei, et al., "Understanding Real World Data Corruptions in Cloud Systems," 2015 IEEE International Conference on Cloud Engineering, IEEE, Mar. 2015.

(Continued)

*Primary Examiner* — Albert Decady
*Assistant Examiner* — Osman M Alshack
(74) *Attorney, Agent, or Firm* — Nelson and Nelson; Daniel P. Nelson (57) ABSTRACT

A method for analyzing data corruption is disclosed. In one embodiment, such a method includes identifying a data set to analyze for data corruption. This data set resides on tracks of a volume. The method further determines, from control information associated with the volume, on which tracks of the volume the data set resides. The method reads content of the data set without opening the data set by performing full-track reads of the tracks. The method further determines an expected format of the content by analyzing the control information. An actual format of the content is compared to the expected format to identify areas of the data set that may be corrupt. A corresponding system and computer program product are also disclosed.

17 Claims, 6 Drawing Sheets

(56) References Cited

U.S. PATENT DOCUMENTS

| | | | | |
|---|---|---|---|---|
| 2003/0023933 | A1* | 1/2003 | Duncan | G11B 20/1803 |
| | | | | 714/807 |
| 2005/0188279 | A1* | 8/2005 | Gibble | G06F 11/1064 |
| | | | | 714/42 |
| 2011/0173404 | A1* | 7/2011 | Eastman | G06F 11/1451 |
| | | | | 711/162 |
| 2011/0258164 | A1* | 10/2011 | Mandagere | G06F 11/1435 |
| | | | | 707/685 |
| 2014/0006853 | A1* | 1/2014 | Dudgeon | G06F 11/1451 |
| | | | | 714/15 |
| 2016/0004442 | A1* | 1/2016 | Bailey | G06F 3/067 |
| | | | | 711/112 |
| 2016/0239386 | A1* | 8/2016 | Huber | G06F 3/0659 |
| 2016/0328303 | A1* | 11/2016 | Brandner | G06F 11/2094 |
| 2016/0364302 | A1* | 12/2016 | Huber | G06F 11/00 |
| 2017/0351440 | A1* | 12/2017 | Carson | G06F 3/065 |

OTHER PUBLICATIONS

Barbara, Daniel, et al., "Using Checksums to Detect Data Corruption," International Conference on Extending Database Technology, Mar. 2000.

Liu, et al., "Self-Healing Corrupted Segments within a Deduplication Backup System for Cloud Storage," IP.com, IP.com No. IPCOM000230953D, Sep. 20, 2013.

Anonymous, "Layered Data Recovery," IP.com, IP.com No. IPCOM000225382D, Feb. 12, 2013.

Anonymous, "Method and System for Detecting and Recovering Corrupted Critical Data Structures," IP.com, IP.com No. IPCOM000224146D, Dec. 11, 2012.

* cited by examiner

CORRUPTED TRACK ANALYZER

BACKGROUND

Field of the Invention

This invention relates to systems and methods for detecting and analyzing data corruption.

Background of the Invention

Data is increasingly one of an organization's most valuable assets. Accordingly, it is paramount that an organization protect its data, particularly its business-critical data. Statistics show that a high percentage of organizations, as high as fifty percent, are unable to recover from an event of significant data loss, regardless of whether the loss is the result of a virus, data corruption, physical disaster, software or hardware failure, human error, or the like. At the very least, significant data loss can result in lost income, missed business opportunities, and/or substantial legal liability. Accordingly, it is important that an organization implement adequate policies and procedures to prevent such losses from occurring. When data loss or corruption does occur, an organization needs effective tools to recover data, as well as identify the source and timing of the data loss or corruption to prevent it from happening again.

Frequently, an organization is unaware that data has become corrupted until some time after the corruption has occurred. The organization will often have no idea when the corruption occurred, which makes it extremely difficult to identify the source of the corruption, as well as take steps to prevent the corruption from occurring again. In some cases, the organization may not know the state or condition of the data prior to the corruption.

When data corruption is detected, quickly diagnosing and resolving the cause of the data corruption can be critically important. Unfortunately, when diagnosing data corruption in data sets stored on direct-access storage devices (DASD) such as hard disk drives, current diagnostic tools may be inadequate. These tools may be configured to print physical data on a track or try to print records of a data set, but may fail when they encounter broken areas of the data set. Current recovery methods that use access methods such as BSAM, QSAM, or VSAM to read individual records or blocks may fail when they encounter a corrupt track or record.

In view of the foregoing, what are needed are systems and methods to process an entire data set, understand areas of the data set that are not broken or corrupt, and provide additional diagnostic information about areas of the data set that are broken or corrupt.

SUMMARY

The invention has been developed in response to the present state of the art and, in particular, in response to the problems and needs in the art that have not yet been fully solved by currently available systems and methods. Accordingly, the invention has been developed to provide systems and methods to more effectively detect and analyze data corruption. The features and advantages of the invention will become more fully apparent from the following description and appended claims, or may be learned by practice of the invention as set forth hereinafter.

Consistent with the foregoing, a method for analyzing data corruption is disclosed. In one embodiment, such a method includes identifying a data set to analyze for data corruption. This data set resides on tracks of a volume. The method further determines, from control information associated with the volume, on which tracks of the volume the data set resides. The method reads content of the data set without opening the data set by performing full-track reads of the tracks. The method further determines an expected format of the content by analyzing the control information. An actual format of the content is compared to the expected format to identify areas of the data set that may be corrupt.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
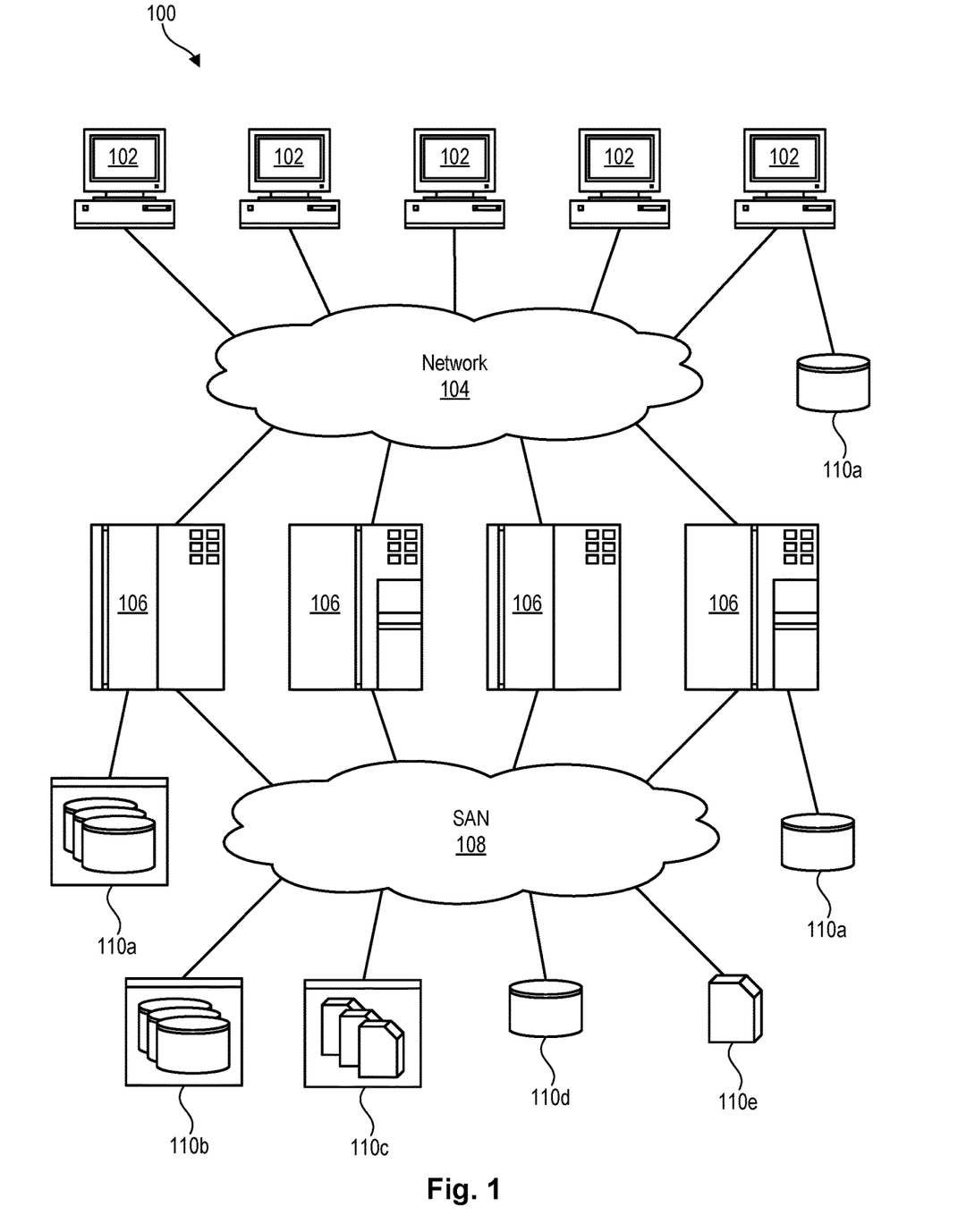
FIG. 1 is a high-level block diagram showing one example of a network environment in which systems and methods in accordance with the invention may be implemented.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 110a (e.g., arrays of hard-disk drives, solid-state drives, tape drives, etc.). These computers 102, 106 and direct-attached storage systems 110a may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110b of hard-disk drives or solid-state drives, tape libraries 110c, individual hard-disk drives 110d or solid-state drives 110d, tape drives 110e, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
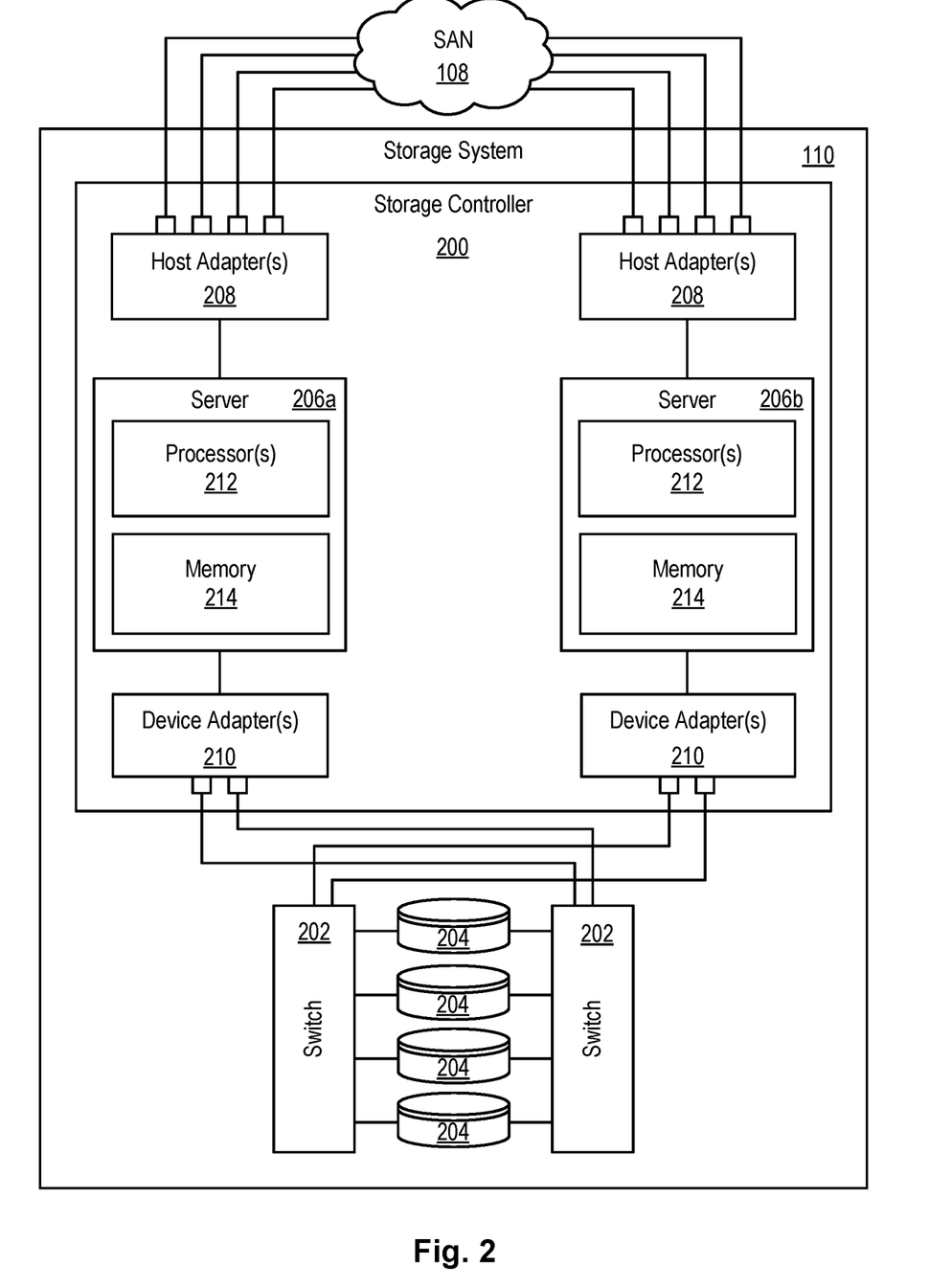
FIG. 2 is a high-level block diagram showing one example of a storage system in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented by way of example and is not intended to be limiting.

Figure 3:
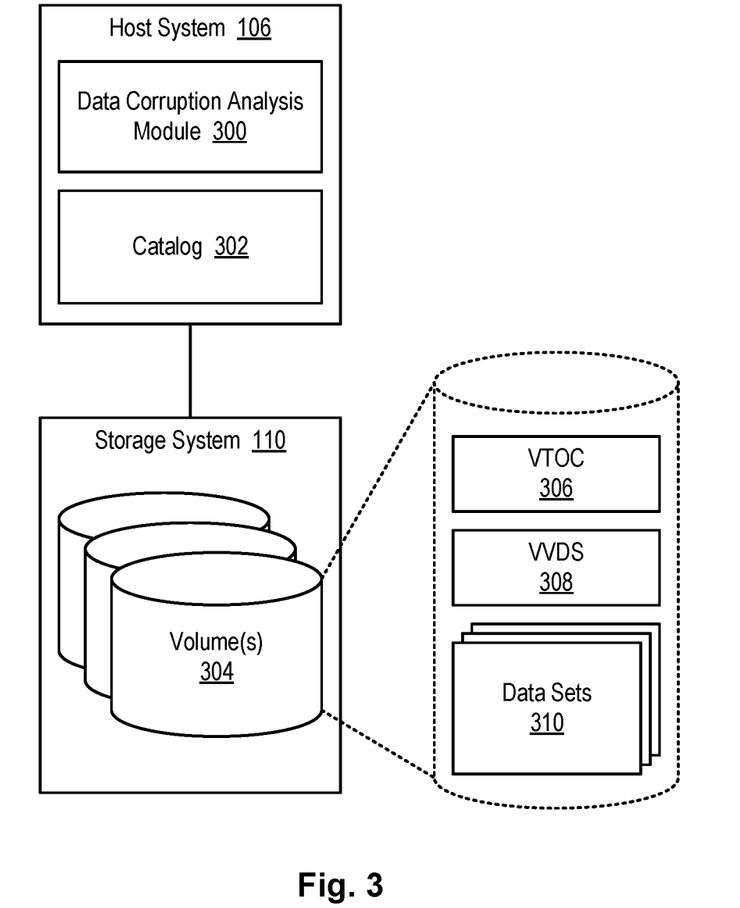
FIG. 3 is a high-level block diagram showing a data corruption analysis module, as well as different types of control information that may be associated with a data set.

Referring to FIG. 3, in certain embodiments, a storage system 110 such as that illustrated in FIG. 2 may host various volumes 304 (e.g., logical volumes 304) to store data. In certain embodiments, this data may be stored in the form of data sets 310, such as Virtual Storage Access Method (VSAM) data sets 310. Each volume 304 may, in certain embodiments, include a volume table of contents (VTOC) 306 that provides a way of locating data sets 310 that reside on a particular volume 304.

As further shown in FIG. 3, the host system 106 may utilize a catalog 302. A catalog 302 may describe data set attributes and indicate the volume 304 or volumes 304 on which a data set 310 is located. When a data set 310 is cataloged, it may be referred to by name without needing to specify where the data set 310 is stored. As further shown in FIG. 3, a volume 304 may, in certain embodiments, include a VSAM Volume Data Set (VVDS) 308. Entries in the catalog 302 may specify the names and volume serial numbers of cataloged data sets 310. Nearly all other information on the logical and physical characteristics of data sets 310, such as sharing, attributes, control interval size, record length, and so on, may be stored in the VVDS 308.

As previously mentioned, an organization is oftentimes unaware that data within a data set 310 has become corrupted until some time after the corruption has occurred. The organization will often have no idea when the corruption occurred, which makes it extremely difficult to identify the source of the corruption, as well as take steps to prevent the corruption from occurring again. In some cases, an organization may not know the state or condition of data in a data set 310 prior to the corruption.

When data corruption is detected within a data set 310, quickly diagnosing and resolving the cause of the corruption may be critically important. Unfortunately, when diagnosing data corruption in data sets 310 stored on direct-access storage devices (DASD) such as hard disk drives 204, current diagnostic tools may be inadequate. These tools may be configured to print physical data on a track or try to print records of a data set 310, but may fail when they encounter broken areas within the data set 310. Current recovery methods that use access methods such as BSAM, QSAM, or VSAM to read individual records or blocks may fail when a corrupt track or record is found.

Thus, systems and methods are needed process an entire data set 310, understand areas of the data set 310 that are not broken or corrupt, and provide additional diagnostic information about areas of the data set 310 that are broken or corrupt. In certain embodiments, a data corruption analysis module 300 in accordance with the invention may be implemented within the host system 106 (or another computing system) to provide these functions. The various features and functions of the data corruption analysis module 300 will be discussed in more detail in association with FIG. 4.

Figure 4:
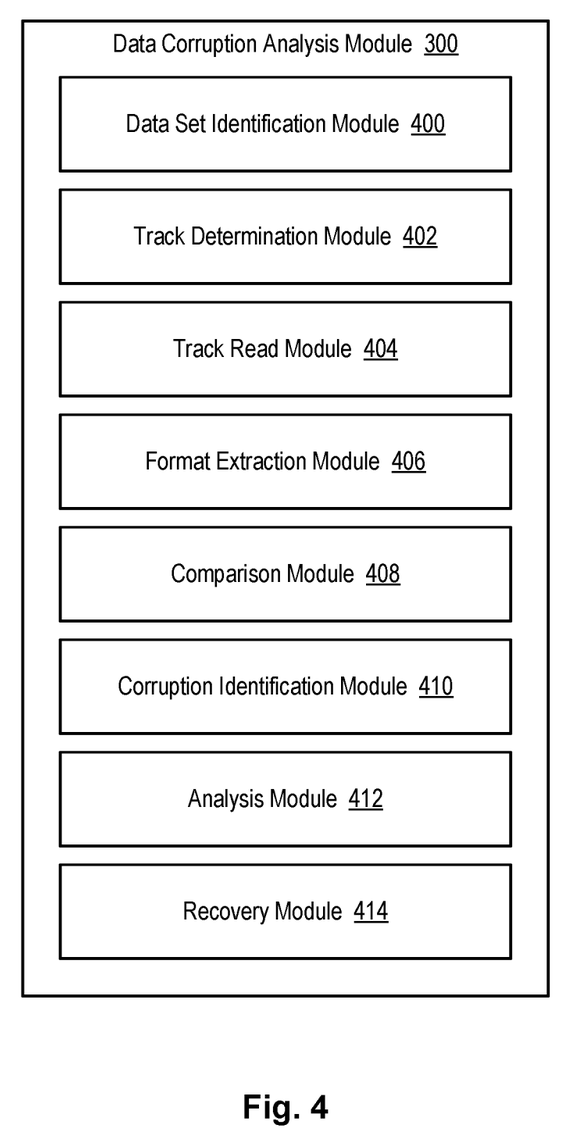
FIG. 4 is a high-level block diagram showing various sub-modules within a data corruption analysis module in accordance with the invention.

Referring to FIG. 4, a high-level block diagram showing a data corruption analysis module 300 and associated sub-modules is illustrated. The data corruption analysis module 300 and associated sub-modules may be implemented in hardware, software, firmware, or combinations thereof. The data corruption analysis module 300 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the data corruption analysis module 300 includes one or more of a data set identification module 400, track determination module 402, track read module 404, format extraction module 406, comparison module 408, corruption identification module 410, analysis module 412, and recovery module 414.

Figure 5:
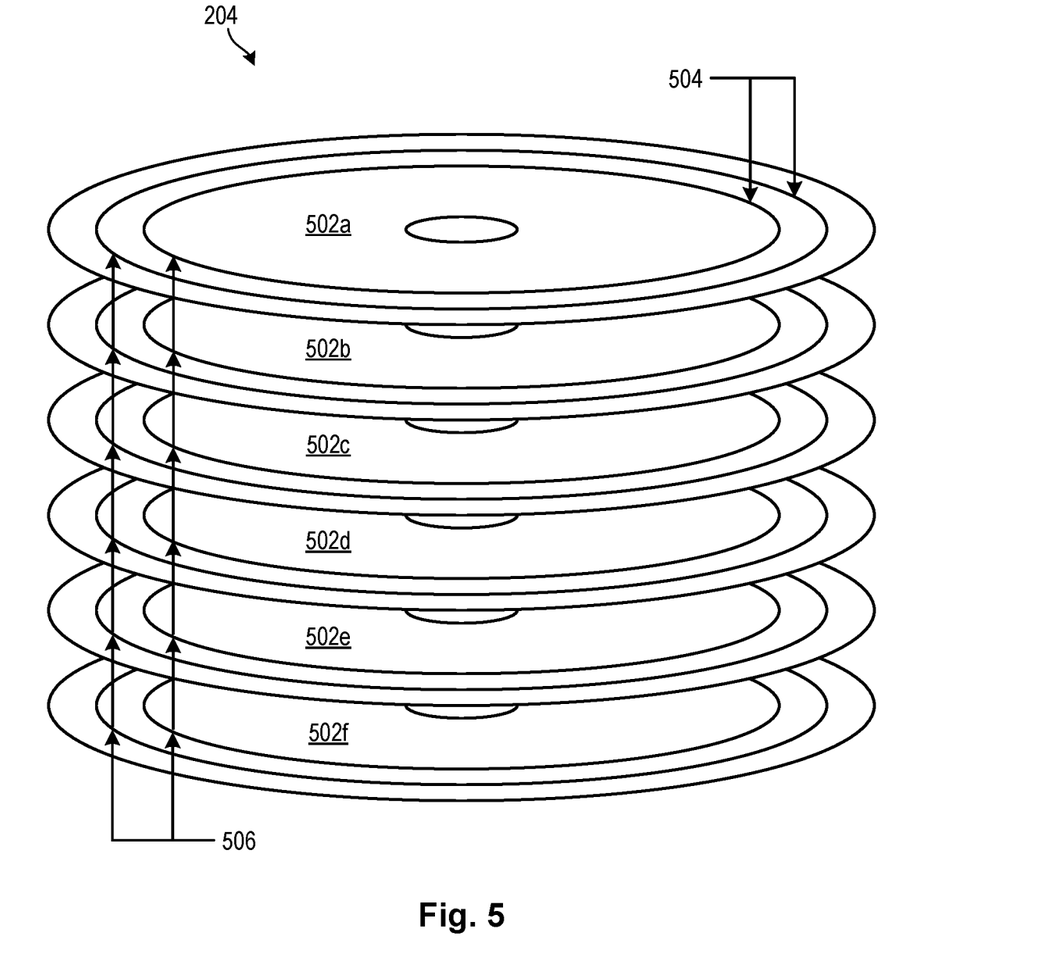
FIG. 5 is a high-level block diagram showing platters, tracks, and cylinders within a disk drive.

The data set identification module 400 may identify a data set 310, or portions thereof, to be analyzed. In certain embodiments, this may be accomplished by receiving, from a user, a data set name and portions of the data set 310 that the user wants analyzed. The track determination module 402 may then determine which tracks of a storage drive 204 or drives 204 are used to store data associated with the data set 310. FIG. 5 shows a high-level view of a disk drive 204 comprising multiple platters 502, tracks 504 on the platters, and cylinders 506 made up of corresponding tracks 504 across multiple platters 502. In certain embodiments, the tracks 504 hosting a data set 310 may be determined by analyzing control information associated with the data set 310 in the VTOC 306, catalog 302, and/or VVDS 308.

Once tracks 504 associated with a data set 310 are determined, the track read module 404 may perform full-track reads of the data set's tracks 504 into memory. The full-track reads may enable contents of a track 504 to be obtained even if data or formatting (e.g., block size, record length, data location etc.) on the track 504 is not as expected. The full-track reads may be performed without opening the data set 310 and without using any access methods (e.g., BSAM, QSAM, VSAM, etc.) to access data in the data set 310.

Meanwhile, the format extraction module 406 may determine an expected format (e.g., expected block size, expected record length, expected location of data, etc.) for data within the data set 310. This may be accomplished, for example, by analyzing control information associated with the data set 310 and/or volume 304 hosting the data set 310, such as information in the VTOC 306, catalog 302, VVDS 308, SMS data, storage classes, or the like, depending on the attributes of the data set 310.

Figure 6:
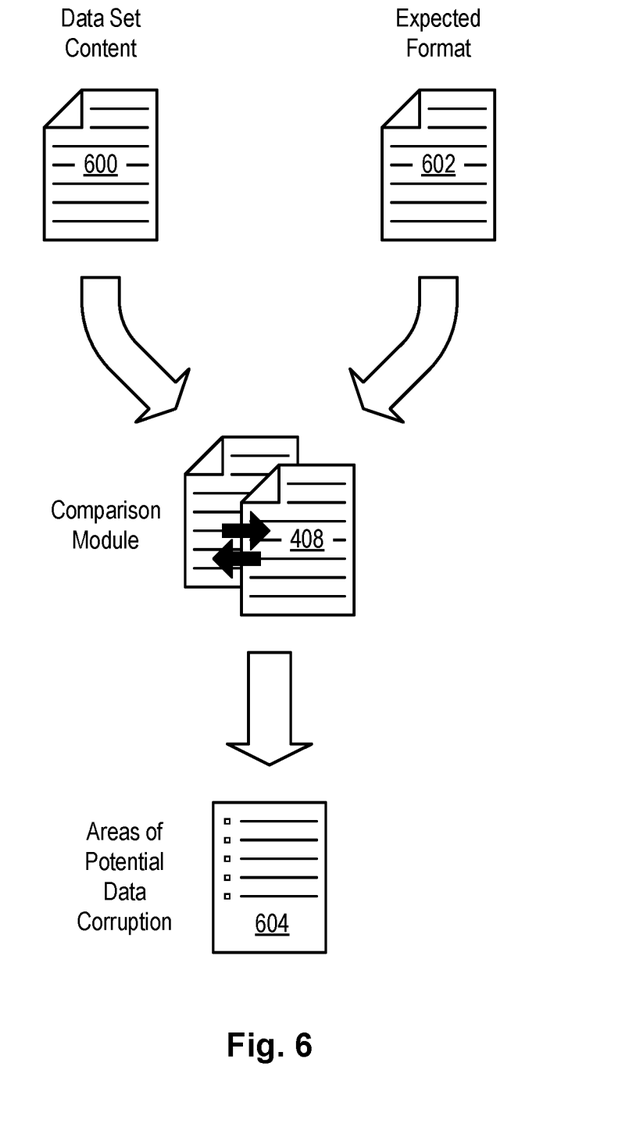
FIG. 6 is a flow diagram showing operation of a comparison module in accordance with the invention.

Once the content (e.g., data, formatting, etc.) of the tracks 504 and the expected format 602 is obtained, the comparison module 408 may compare the content 600 of the tracks 504 to the expected format 602 to identify differences or discrepancies therebetween. This process is shown in FIG. 6. Any differences or discrepancies between the content 600 and the expected format 602 may indicate areas 604 of potential data corruption. The corruption identification module 410 may identify these areas 604 of potential data corruption for closer analysis. Similarly, an analysis module 412 may analyze the areas 604 to further break down the areas 604 (such as by analyzing internal fields, etc.) to determine whether data corruption exists and its possible sources or causes.

In certain embodiments, a recovery module 414 may enable recovery of valid data (e.g., valid records, valid blocks, etc) from the tracks 504. This recovered data may, in certain embodiments, be stored in a recovery data set 310. An example of information obtained by the recovery module 414 may include data set type (VSAM verse non-VSAM), type of VSAM data set, record format, logical record length and block size for non-VSAM data sets, volumes 304 and extents upon those volumes 304 for all data set types, if the data set 310 is extended format, compressed, or striped. VSAM data sets 310 may require additional information from the catalog 302 to enable creation of individual recovery records, including, but not limited to: the physical record size, number of physical records per track 504, and control interval size because of the various formats of VSAM data set types that are stored on disk drives 204.

In a more particular example or application of the invention, the data corruption analysis module 300 may, assuming an entire data set 310 is processed, use extent information obtained from the catalog 302 and/or VTOC 306 to issue a full-track read of the first track 504 of the data set 310 into memory. This full-track read may return some number of physical records that reside on the storage drive 204. If the data set 310 is a VSAM data set 310 that has control intervals that span multiple tracks 504, the data corruption analysis module 300 may perform a second full-track read into memory.

At this point, the data corruption analysis module 300 may check the block size for non-VSAM data sets, or the control interval size for VSAM data sets against the size of physical records on the storage drive 204. If these values match, for non-VSAM data sets, the data corruption analysis module 300 may extract individual records using a logical record length and block size for a data set having fixed-length records. For a non-VSAM data set with variable-length records, the data corruption analysis module 300 may use block descriptor words and record descriptor words to extract individual records. For linear VSAM data sets, if a control interval size matches a physical record size, the data corruption analysis module 300 may extract the entire content of the control interval. For all other types of VSAM data sets, the data corruption analysis module 300 may use control interval descriptor fields and record descriptor fields to extract individual records. When extracting records, if the records are compressed, the data corruption analysis module 300 may decompress the records based on a value of a compaction option in an SMS data class. This process may be repeated for each physical record for the track 504 that was read. For a non-striped data set 310, the data corruption analysis module 300 may process the next sequential track. If the data set 310 is striped, the data corruption analysis module 300 may process the next track 504 in the order the tracks 504 were originally written across the various stripes (i.e., volumes 304).

As mentioned above, the data corruption analysis module 300 may establish a recovery data set 310. The data corruption analysis module 300 may write records that can be extracted from a full-track read to the recovery data set 310. In certain embodiments, the data corruption analysis module 300 only writes records that are valid from a logical viewpoint. If there are partial or incomplete records, the data corruption analysis module 300 may list them. When validating records, the data corruption analysis module 300 may check internal fields of the records to determine whether they contain corrupted data. In certain embodiments, an optional parameter may be provided to either: write partial or incomplete records to the recovery data set 310, write the records to the recovery data set 310 with a warning and listing of the record, or not write the records to the recovery data set 310 at all.

For data that does not match what is expected, the data corruption analysis module 300 may attempt to identify the block size and record length of the data. The block size may be identified in the count field for each block on a track 504. The data corruption analysis module 300 may scan the block to try to determine if the data is VSAM or non-VSAM based on the presence of control information such as control interval definition fields (CIDFs) and record descriptor fields (RDFs). The data corruption analysis module 300 may check block descriptor words (BDWs) and record descriptor words (RDWs) to determine if data is non-VSAM. Based on these characteristics, the data corruption analysis module 300 may scan the VTOC 306 to determine what other data set 310 on a volume 304 match these attributes as possible owners of the data.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for analyzing data corruption, the method comprising:
    identifying a data set to analyze for data corruption, the data set residing on tracks of a volume;
    determining, from control information associated with the volume, the tracks that the data set resides on;
    reading content of the data set by performing full-track reads of the tracks without opening the data set and without using any of a basic sequential access method (BSAM), queued sequential access method (QSAM), and virtual storage access method (VSAM) that is customarily used to access the data set;
    determining an expected format of the content by analyzing the control information; and
    comparing an actual format of the content to the expected format to identify areas of the data set that are corrupt.

2. The method of claim 1, wherein the control information comprises a volume table of contents (VTOC) associated with the volume.

3. The method of claim 1, wherein the control information comprises a catalog associated with the volume.

4. The method of claim 1, wherein the expected format includes an expected block size associated with the content.

5. The method of claim 1, wherein the expected format includes an expected record length associated with the content.

6. The method of claim 1, further comprising extracting at least one of good blocks and good records from the content for storage in a recovery data set.

7. A computer program product for analyzing data corruption, the computer program product comprising a computer-readable storage medium having computer-usable program code for execution on at least one processor, the computer-usable program code causing the at least one processor to:
    identify a data set to analyze for data corruption, the data set residing on tracks of a volume;
    determine, from control information associated with the volume, the tracks that the data set resides on;
    read content of the data set by performing full-track reads of the tracks without opening the data set and without using any of a basic sequential access method (BSAM), queued sequential access method (QSAM), and virtual storage access method (VSAM) that is customarily used to access the data set;
    determine an expected format of the content by analyzing the control information; and
    compare an actual format of the content to the expected format to identify areas of the data set that are corrupt.

8. The computer program product of claim 7, wherein the control information comprises a volume table of contents (VTOC) associated with the volume.

9. The computer program product of claim 7, wherein the control information comprises a catalog associated with the volume.

10. The computer program product of claim 7, wherein the expected format includes an expected block size associated with the content.

11. The computer program product of claim 7, wherein the expected format includes an expected record length associated with the content.

12. The computer program product of claim 7, wherein the computer-usable program code is further configured to extract at least one of good blocks and good records from the content for storage in a recovery data set.

13. A system for analyzing data corruption, the system comprising:
    at least one processor;
    at least one memory device operably coupled to the at least one processor and storing instructions for execution on the at least one processor, the instructions causing the at least one processor to:
        identify a data set to analyze for data corruption, the data set residing on tracks of a volume;
        determine, from control information associated with the volume, the tracks that the data set resides on;
        read content of the data set by performing full-track reads of the tracks without opening the data set and without using any of a basic sequential access method (BSAM), queued sequential access method (QSAM), and virtual storage access method (VSAM) that is customarily used to access the data set;
        determine an expected format of the content by analyzing the control information; and
        compare an actual format of the content to the expected format to identify areas of the data set that are corrupt.

14. The system of claim 13, wherein the control information comprises a volume table of contents (VTOC) associated with the volume.

15. The system of claim 13, wherein the control information comprises a catalog associated with the volume.

16. The system of claim 13, wherein the expected format includes an expected block size associated with the content.

17. The system of claim 13, wherein the expected format includes an expected record length associated with the content.

* * * * *